United States Patent [19]

Nelle

[11] Patent Number: 4,530,157

[45] Date of Patent: Jul. 23, 1985

[54] LENGTH MEASURING SYSTEM

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 551,277

[22] Filed: Nov. 14, 1983

[30] Foreign Application Priority Data

Nov. 27, 1982 [DE] Fed. Rep. of Germany ....... 3243966

[51] Int. Cl.³ .............................................. G01B 11/04
[52] U.S. Cl. ................................. 33/125 R; 33/125 C; 33/125 T
[58] Field of Search ............. 33/125 R, 125 A, 125 C, 33/125 T

[56] References Cited

U.S. PATENT DOCUMENTS 4,160,328 7/1979 Ernst ................................. 33/125 R
4,170,826 10/1979 Holstein ........................... 33/125 C
4,320,578 3/1982 Ernst .

FOREIGN PATENT DOCUMENTS 2643304 3/1980 Fed. Rep. of Germany .
2853771 6/1980 Fed. Rep. of Germany .

OTHER PUBLICATIONS

Wegmesssysteme fur grosse Werkzeugmaschinen, by Alfons Ernst, from Messtechnische Information, 8 Ausgabe Marz 1980.

Primary Examiner—Willis Little
Attorney, Agent, or Firm—Willian, Brinks, Olds, Hofer, Gilson & Lione, Ltd.

[57] ABSTRACT

In an encapsulated length measuring system for measuring the relative position of two objects, a housing is provided which surrounds a measuring scale. The scale is mounted to the housing in such a manner that upon thermal length changes the scale is movable in the measuring direction substantially independently of the housing. The housing is mounted by means of a first fastening element at about its mid-point along the longitudinal measuring direction directly to the object to be measured. Both ends of the housing are mounted by means of further fastening elements to the object to be measured, in each case by means of a length compensating element which accommodates longitudinal translation in the measuring direction between the ends of the housing and the object to be measured.

13 Claims, 2 Drawing Figures

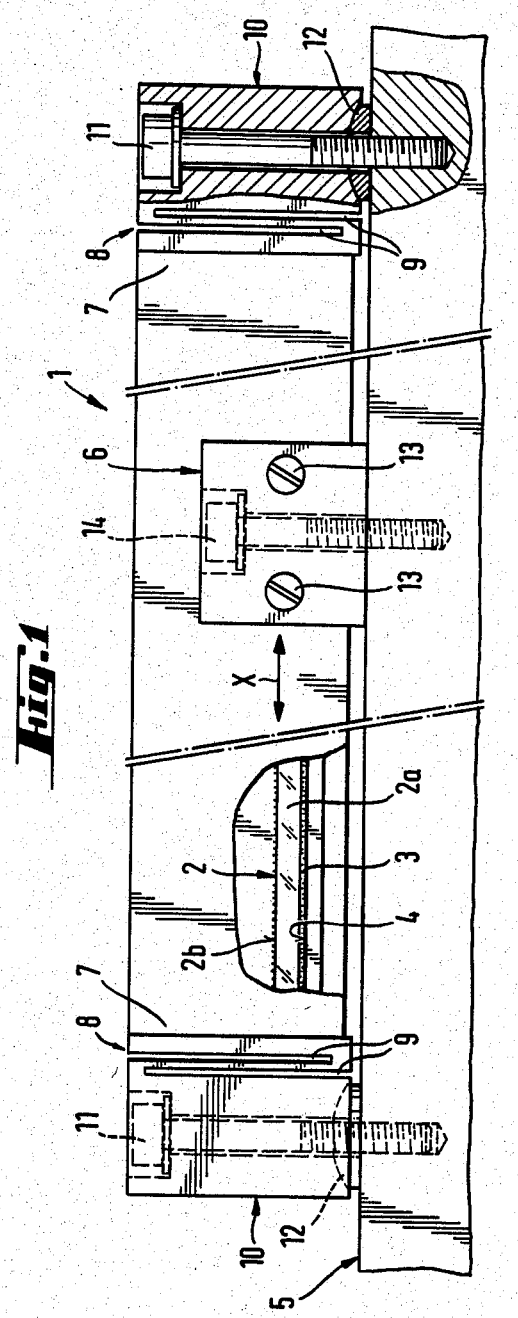
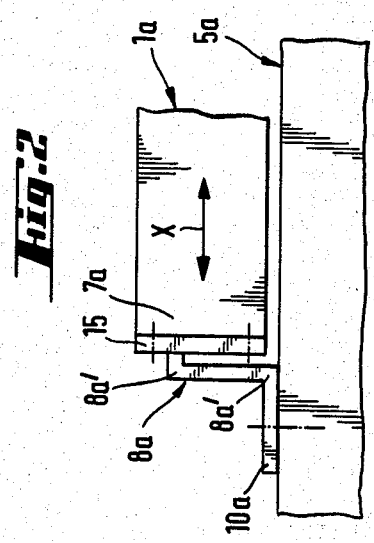

LENGTH MEASURING SYSTEM

BACKGROUND OF THE INVENTION

The present invention relates to length measuring systems for measuring or adjusting the relative position of two objects. In particular, this invention is suitable for use with encapsulated length measuring systems which incorporate a measuring scale arranged on a carrier, in which the measuring scale includes a graduation mounted on a graduation carrier, and in which the graduation carrier is movable slightly in the measuring direction substantially independently of the carrier in the event of thermally induced changes in length. Typically, such carriers are connected by means of fastening elements with one of the two objects, the position of which is to be measured. The graduation carrier of the scale may consist for example of a rigid glass bar which is mounted to the carrier by means of an elastic adhesive layer. Alternately, the graduation carrier may be formed of a flexible metal band which is mounted in a groove defined by the carrier so as to be held in position in a manner substantially free of distorting forces.

From West German DE-AS No. 26 43 304 it is known to provide an encapsulated length measuring system for measuring the relative position of two objects in which a measuring scale which defines a graduation rests on the edges of a longitudinal channel defined in the interior of a hollow profile housing. In the disclosed system the measuring scale is fastened in its middle by means of an adhesive of very low elasticity to the edges of the longitudinal channel, and in other places by means of an adhesive of high elasticity. The hollow profile is mounted at each end to an object, in each case by means of a fastening element which defines one or more weakened places in the form of grooves which are provided to avoid undesirable tension in the fastening of the hollow profile to the attachment surface of the object to be measured. In this measuring arrangement the measuring scale, which is made up of the graduation carrier and the graduation, defines at its middle section a fixed or zero point with respect to the hollow profile. In the event of thermally induced changes in length of the hollow profile with respect to the object to be measured, longitudinal forces extending along the measuring direction may be induced in the hollow profile because of the rigid fastening of the hollow profile at both ends to the object to be measured. Such induced longitudinal forces may lead to a displacement of the fixed zero point and thereby to inaccuracies in measuring.

West German DE-OS No. 28 53 771 discloses a length measuring system which includes a housing which is mounted at both ends of a fastening element to an object to be measured. In this system, one end of the housing is joined directly by means of a first fastening element to the object to be measured, and a length compensating element is provided between the other end of the housing and a second fastening element. This length compensating element operates in such a manner that the associated end of the housing is mounted to the object to be measured with a translatory degree of freedom extending along the longitudinal direction of the housing. The disclosed system includes a measuring scale mounted in the interior of the housing. In order to avoid zero point displacements of the scale with respect to the housing in the event of temperature changes, the scale should be solidly joined with the housing at the same end of the housing as that at which the housing is directly mounted to the object to be measured.

If, on the other hand, the measuring scale is mounted to the housing over its entire length, for example with an elastic adhesive layer, and not fixed at one end (so that the scale in the event of thermally induced length variations is movable substantially independently of the housing in the measuring direction) a fixed or zero point with respect to the housing is provided near the center of the measuring scale. Because one end of the housing is directly fastened to the object to be measured by the first fastening element, thermally induced length variations in the housing result in a greater or lesser displacement of all points of the scale with respect to the object to be measured, in the event the housing and the object to be measured have differing coefficients of thermal expansion.

The document of the firm of Dr. Johannes Heidenhain GmbH "Messtechnische Information", 8th edition, March, 1980, in the article "Path Measuring Systems for Large Machine Tools" by Alfons Ernst, describes at page 33 length measuring systems which, as shown in FIGS. 1-3, include housings which are joined at both ends by means of fastening elements with the object to be measured. In the case of large measuring lengths, further fastening angle pieces are provided for the casing between the fastening elements at the ends of the casing. These further fastening angle pieces are provided to avoid any tendency of the housing to sag as a consequence of its own weight.

SUMMARY OF THE INVENTION

The present invention is directed to an improvement to length measuring systems of the general type described above which allows such a scale carrier to be mounted in place so as to preserve the position of the scale with respect to the object to be measured at a desired position, independently of changes in temperature.

According to this invention, a measuring instrument as described initially above is provided with means for securing a central portion of the carrier directly to one of the two objects to be measured, and first and second means for mounting the first and second ends of the carrier, respectively, to the one of the two objects. Each of these first and second mounting means comprises respective means for accommodating longitudinal movement of the respective end of the carrier along the measuring direction with respect to the one of the two objects.

An important advantage of this invention is that it provides a length measuring system in which the carrier for the measuring scale and the object to be measured can be made of materials of differing coefficients of thermal expansion, without impairing the accuracy of the measurement as a result of changes in temperature. The scale can be fastened, for example, to the carrier in a simple manner by means of a uniform elastic adhesive layer, and the need to solidly join the scale to the housing at one end with additional means is avoided.

Further advantageous features of the invention are set forth in the dependent claims. The invention itself, together with further objects and attendant advantages, will best be understood by reference to the following detailed description, taken in conjunction with the accompanying drawings.

BRIEF DESCRIPTION OF THE DRAWINGS

FIG. 1 shows a side view in partial cutaway of a length measuring system which incorporates a first preferred embodiment of this invention.

FIG. 2 shows a schematic representation of portions of a length measuring system which incorporates a second preferred embodiment of this invention.

DETAILED DESCRIPTION OF THE PRESENTLY PREFERRED EMBODIMENTS

Turning now to the drawings, FIG. 1 shows an encapsulated length measuring system which includes a carrier 1 for a measuring scale 2. In this embodiment, the carrier 1 is made in the form of a rigid, elongated, hollow profile of a material such as aluminum, for example. The scale 2 of FIG. 1 is made up of a graduation carrier 2a which defines a graduation 2b that extends along the length of the scale 2. The scale 2 is fastened by means of an elastic adhesive layer 3 to an internal surface 4 defined by the carrier 1. The graduation 2b of the scale 2 is scanned in a known manner by a scanning unit (not shown) for measuring the relative position of two objects (for example, the bed and slide piece of a processing machine). The scanning unit is joined (in a manner not shown) with a first object, and the carrier or housing 1 is secured to the other object 5. This other object 5 may, for example, be formed of cast iron.

According to this invention, the housing 1 is secured at about its middle by means of a first fastening element 6 directly to the object 5 to be measured. As shown in FIG. 1, the fastening element 6 is rigidly secured to the housing 1 by means of screws 13, and it is rigidly secured to the object 5 by means of screws 14. In addition, the housing 1 is joined at both ends 7 to further fastening elements 10. Each of these further fastening elements 10 includes a respective length compensating element 8, and each of the fastening elements 10 is secured by means of respective screws 11 and ball joints 12 to the object 5. Each of the ball joints 12 includes a disc which defines a flat lower surface adapted to contact the object 5 and a spherically convex upper surface adapted to rotatably fit within a mating concave recess formed in the fastening element 10. In this preferred embodiment, each of the length compensating elements 8 is formed as an integral component of the fastening element 10 and is defined by a meander pattern of partially overlapping slits 9, each of which is oriented perpendicularly to the measuring direction X. In this embodiment, the measuring direction X corresponds to the longitudinal direction of the housing 1. The length compensating elements 8 in the fastening elements 10 act to mount the ends 7 of the housing 1 with a single translatory degree of freedom which extends along the measuring direction X.

In the event of differing coefficients of thermal expansion between the housing 1 and the object 5, temperature variations will result in length changes of the housing 1 with respect to the object 5. However, because the middle portion of the housing 1 is directly and rigidly fastened by the first fastening element 6 to the object 5, and because the ends 7 of the housing 1 are mounted so as to be movable in the measuring direction X with respect to the object 5, the position of the scale 2 with respect to the object 5 remains substantially constant, even in the face of changes of temperature. This is because thermally induced length changes of both the housing 1 and the scale 2 occur symmetrically with respect to the midpoint in the measuring direction X, and the mid-point of the housing 1 is fixedly secured in place by the fastening element 6. The center of the scale is maintained at a fixed measuring reference point (zero point) even in the face of differential thermal expansion among the scale 2, the housing 1, and the object 5. In this way the accuracy of measurement is improved. Because the ends 7 of the housing 1 are mounted so as to be movable in the X direction by a small amount, temperature-induced length changes of the housing 1 with respect to the object 5 do not generate longitudinal forces on the housing 1, such as can lead to a displacement of the measuring reference point at the middle of the scale 2 or to distortion of the housing 1. The elastic adhesive layer 3 accommodates differential thermal length changes between the graduation carrier 2a of the scale 2 (which may be formed, for example, of glass) and the housing 1 (which may, for example, be formed of aluminum). Thus, all parts of the scale 2 remain substantially allocated to the corresponding parts of the object 5 with respect to position.

In a manner not shown the graduation carrier of the scale may also comprise a flexible metal band which is arranged and confined in a groove defined in the carrier for the scale in a manner which substantially isolates the flexible metal band from distorting forces.

FIG. 2 is a schematic view of portions of a second preferred embodiment of this invention. As shown in FIG. 2, one end 7a of a housing 1a of a length measuring system is closed with a closure cover 15 which is connected by means of a length compensating element 8a to a fastening element 10a arranged on an object 5a to be measured. The fastening element 10a and the compensating element 8a are in this embodiment constructed in the form of a double-L angle and are formed, together with the closure cover 15, of one integral piece. In this embodiment, the fastening element 10a and the compensating element 8a define a Z shape. The compensating element 8a is joined at one end to the closure cover 15 and at the other end to the fastening element 10a by means of respective spring joints 8a'. The spring joints 8a' are regions of the integral assembly which allow a bending movement, and in each case the spring joints 8a' define an axis of rotation running perpendicularly to the measuring direction X. The other end of the housing 1a is mounted to the object 5a in a similar manner, and the mid-point of the housing 1a is fixedly secured to the object 5a in a manner similar to that described above in connection with FIG. 1.

In a manner not shown, the length compensating element may consist of two rotary joints connected with one another with the axis of rotation of each rotary joint running perpendicularly to the measuring direction X. Furthermore, the length compensating element may be formed by a spring element designed in accordance with the teaching of German DE-OS No. 28 53 771 or by a longitudinal bearing which guides the respective ends of the housing in longitudinal movement.

The ball joints 12 in the fastening elements 10 allow the housing 1 to be mounted to an uneven attachment surface of the object 5, substantially without applying distorting forces to the housing 1. Since the length compensating elements 8 permit a slight angular movement of the housing 1 in a plane parallel to the measuring direction X and perpendicular to the attachment surface of the object 5, the ball joints 12 can be omitted in some embodiments. It should be noted that the fastening element 10 serves simultaneously as a closure cover for the ends of the housing 1. Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a measuring instrument for measuring the relative position of first and second objects, said instrument being of the type comprising a carrier which extends along a measuring direction and a scale which defines a graduation and is mounted to the carrier so as to be slightly movable in the measuring direction substantially independently of the carrier, said carrier defining first and second ends, the improvement comprising:

means for securing a central portion of the carrier directly to the first object; and first and second means for mounting the first and second ends of the carrier, respectively, to the first object, each of said first and second mounting means comprising respective means for accommodating longitudinal movement of the respective end in the measuring direction with respect to the first object;

said securing means and mounting means cooperating to accommodate thermally induced movement of both ends of both the carrier and the scale along the measuring direction with respect to the first object.

2. The invention of claim 1 wherein each of the means for accommodating longitudinal movement is formed as an integral part of and in one piece with the respective one of the first and second mounting means.

3. The invention of claim 2 wherein each of the means for accommodating longitudinal movement comprises:

means for defining a plurality of partially overlapping slits in the respective one of the first and second mounting means, said slits oriented in respective planes substantially perpendicularly to the measuring direction to define a meander pattern in the respective one of the mounting means.

4. The invention of claim 2 wherein each of the means for accommodating longitudinal movement comprises a respective double-L shaped support arm.

5. The invention of claim 1 wherein each of the means for accommodating longitudinal movement comprises two interconnected, spaced spring joints, each of which defines a respective axis of rotation oriented perpendicularly to the measuring direction.

6. The invention of claim 1 wherein the carrier comprises a housing which encloses the scale, wherein the scale is secured to the housing by an elastic adhesive layer, wherein the securing means comprises a first fastener which secures the housing directly to the one of the two objects near the center of the housing, and wherein each of the first and second mounting means comprises a respective length compensating element secured to a respective end of the housing and a respective second fastener which secures the length compensating element to the first object.

7. The invention of claim 6 wherein the first and second mounting means act to seal the respective ends of the housing.

8. The invention of claim 1 wherein at least one of the first and second mounting means comprises a ball joint positioned to conform to the first object.

9. In a length measuring system for measuring the relative position of first and second objects, said system comprising an elongated housing which extends along a measuring direction and defines first and second ends and a central portion spaced along the measuring direction, and a measuring scale disposed in the housing so as to be slightly movable in the measuring direction, substantially independently of the housing, the improvement comprising:

first and second fastening elements, each fixedly secured to a respective one of the first and second ends of the housing, and each defining a mounting portion and an array of partially overlapping parallel slits oriented perpendicularly to the measuring direction between the mounting portion and the housing;

first and second fasteners which rigidly and fixedly secure the mounting portions to the first object;

at least one ball joint interposed between the first object and one of the mounting portions; and a third fastener which rigidly and fixedly secures the central portion of the housing to the first object;

said arrays of parallel slits accommodating longitudinal movement of the ends of the housing in the measuring direction with respect to the first object.

10. In a length measuring system for measuring the relative position of first and second objects, said system comprising an elongated housing which extends along a measuring direction and defines first and second ends and a central portion spaced along the measuring direction, and a measuring scale disposed in the housing so as to be slightly movable in the measuring direction, substantially independently of the housing, the improvement comprising:

first and second fastening elements, each fixedly secured to a respective one of the first and second ends of the housing, and each defining a Z-shaped portion which is secured to the respective end of the housing, which defines a mounting plate, and which defines two spring joints between the mounting plate and the housing, said spring joints each defining a respective axis of rotation oriented perpendicularly to the measuring direction;

first and second fasteners which rigidly and fixedly secure the mounting plates to the first object; and a third fastener which rigidly and fixedly secures the central portion of the housing to the first object;

said Z-shaped portions and spring joints accommodating longitudinal movement of the ends of the housing in the measuring direction with respect to the first object.

11. The invention of claim 1 wherein the scale defines a midpoint along the measuring direction, and wherein the central portion of the carrier is positioned at about the midpoint of the scale such that the scale is coupled to the first object by the securing means at about the midpoint of the scale and the scale expands and contracts with thermal variations symmetrically with respect to the midpoint of the scale.

12. The invention of claim 1 wherein the scale defines a midpoint along the measuring direction, wherein the central portion of the carrier is aligned with the midpoint of the scale, and wherein the securing means maintains the midpoint of the scale fixed with respect to the first object.

13. The invention of claim 1 wherein the carrier mechanically isolates the scale from the first object, thereby avoiding mechanical interaction between the scale and the first object.

* * * * *